United States Patent [19]
Kikuzawa et al.

[11] Patent Number: 5,684,919
[45] Date of Patent: Nov. 4, 1997

[54] RECORDING APPARATUS FOR A VIDEO SIGNAL AND A CONTROL INFORMATION INDICATIVE OF A CONTROL STATE OF A VIDEO CAMERA

[75] Inventors: Masahiko Kikuzawa; Hidetoshi Wada; Hisataka Hirose, all of Kanagawa-ken; Hideo Kawahara, Saitama-ken, all of Japan

[73] Assignee: Canon Kabushiki Kaisha, Tokyo, Japan

[21] Appl. No.: 168,924

[22] Filed: Dec. 17, 1993

Related U.S. Application Data

[63] Continuation of Ser. No. 625,375, Dec. 11, 1990, abandoned.

[30] Foreign Application Priority Data

Dec. 15, 1989 [JP] Japan ................................ 1-325010

[51] Int. Cl.[6] ........................... H04N 5/225; H04N 5/76
[52] U.S. Cl. ..................... 386/95; 348/207; 360/18; 360/27; 358/906
[58] Field of Search ........................ 358/335, 341, 358/343, 906, 909.1; 348/207, 222, 225; 360/33.1, 27, 13, 14.1, 18; 386/46, 95; H04N 5/76, 5/225

[56] References Cited

U.S. PATENT DOCUMENTS

| | | | |
|---|---|---|---|
| 4,363,051 | 12/1982 | Maeda et al. | 358/906 |
| 4,366,501 | 12/1982 | Tsunekawa et al. | 358/906 |
| 4,799,111 | 1/1989 | Ito | 360/14.3 |
| 4,851,897 | 7/1989 | Inuma et al. | 358/225 |
| 4,858,028 | 8/1989 | Okino | 358/335 |
| 4,888,651 | 12/1989 | Maeda et al. | 358/906 |
| 4,956,726 | 9/1990 | Takimoto et al. | 358/335 |
| 5,032,927 | 7/1991 | Watanabe et al. | 358/335 |
| 5,050,009 | 9/1991 | Takahashi et al. | 358/906 |
| 5,086,345 | 2/1992 | Nakane et al. | 358/906 |

*Primary Examiner*—Khoi D. Truong
*Attorney, Agent, or Firm*—Robin, Blecker, Daley & Driscoll

[57] ABSTRACT

An apparatus for recording a video signal while forming a multiplicity of recording tracks in parallel on a tape-shaped recording medium, wherein camera information representing the operating state of a camera when shooting each picture is recorded in a position corresponding to the recorded track of that picture so that the operating state of the camera at the time of taking the video signal which has already been recorded can reappear. Therefore, in a case where a video signal is recorded in continuity with this recorded portion, the camera operating state is controlled in a joint portion of these to improve the continuity in this joint portion.

42 Claims, 5 Drawing Sheets

FIG.6

| DATA | CAMERA INFORMATION |
|---|---|
| DA0 | EXPOSURE (AUTO/MANUAL, SET F VALUE) |
| DA1 | WHITE BALANCE (AUTO/MANUAL, COLOR TEMPERATURE) |
| DA2 | FOCUSING (AUTO/MANUAL, LENS POSITION) |
| DA3 | ZOOMING (LENS POSITION) |
| DA4 | ELECTRONIC SHUTTER (SHUTTER SPEED) |

RECORDING APPARATUS FOR A VIDEO SIGNAL AND A CONTROL INFORMATION INDICATIVE OF A CONTROL STATE OF A VIDEO CAMERA

This is a continuation application under 37 CFR 1.62 of prior application Ser. No. 625,375, filed Dec. 11, 1990, now abandoned.

BACKGROUND OF THE INVENTION

1. Field of the Invention

This invention relates to video signal recording apparatuses and, more particularly, to an apparatus connectable with a video camera, which apparatus records video signals while forming a great number of parallel tracks on a tape-shaped recording medium.

2. Description of the Related Art

In the VTR having the video camera integrated therewith, it has been conventional that as the information recordable when shooting, besides the video signal and the audio signal, there are items of information such as shot date and time, tape counter, program number and head search (hereinafter referred to as the "index" information), and in the reproduction mode, these items of information can be utilized for the purposes of compilation and others.

About the place where the index information is recorded, explanation is made taking an example of the known VTR. FIG. 1 illustrates the track patterns of the 8 mm VTR. On a tape 41, there are recording tracks 42, 43 and 44 formed successively by rotary heads, and a cue track 47 and an audio track 48 formed by fixed heads. Each of the recording tracks 42, 43 and 44 has a PCM area 45 in which PCM audio signals, etc. are recorded and a video area 46 in which video signals, FM audio signals, etc. are recorded. As the place in which the index information is recorded, the cue track 47 can be utilized. Besides this, the PCM area 45 can also be utilized.

FIG. 2 shows a track format of the PCM area 45. In the order in which the rotary head scans, a scanning start portion 51 at which the rotary head starts scanning, a preamble portion 52 which is a clock synchronized with the PCM audio data, a PCM audio portion 53 where the PCM audio data is recorded, a postamble portion 54 which is a back margin of the PCM audio portion 53, and a V-P guard portion 55 serving as the guard between the video area 46 and the PCM area 45. The index information is recorded in a region of the PCM audio portion 53. The index information in normally coded form (in the following, the data obtained by coding the index information is called the index data), can be recorded together with the PCM audio data. It is also possible to use the postamble portion 54 in a certain part thereof only by a predetermined region to write "0" (hereinafter called the "0" index), so that in the reproduction mode, this part is detected as the mark for head search. Thus, the head search can be realized.

It is also to be noted that this PCM area in the general case, even after the shots, is rewritable at any time.

However, even if the index information recorded in such a way as described above is used in compilation works such as joined shooting, insert recording, etc., reproduction of this compiled portion and another portion which is out of compilation leads to some possibility of occurrence of very ugly reproduced pictures, because the reproduced image changes largely at a transition of the scene or at the joint. This is attributable chiefly to the difference in environmental situation between when shooting (recording) other than the compiled portion and when shooting the compiled portion in the insert recording, etc.

SUMMARY OF THE INVENTION

An object of the invention is to solve the above-described problem.

Another object of the invention is to provide a video signal recording apparatus capable of improving the continuity of image at the joint of images on the tape-shaped recording medium.

Under such an environment, according to the invention, in an embodiment thereof, a video signal recording apparatus is proposed, comprising video recording means for recording a video signal coming from a video camera while forming a multiplicity of recording tracks in parallel on a tape-shaped recording medium; input means for inputting control information corresponding to an operating state of the video camera, and control recording means for recording the control information in a recording position which is determined in correspondence with a recorded position of each of pictures of the video signal recorded on the tape-shaped recording medium.

Other objects than those described above of the invention and its features will become apparent from the following description of embodiments of the invention by reference to the drawings.

BRIEF DESCRIPTION OF THE DRAWINGS

FIG. 6 is a table illustrating the data format of the camera information which is recorded according to the recording format of FIG. 5.

DETAILED DESCRIPTION OF THE PREFERRED EMBODIMENTS

An embodiment of the invention applied to the camera-integrated type 8 mm VTR is described below.

Figure 1:
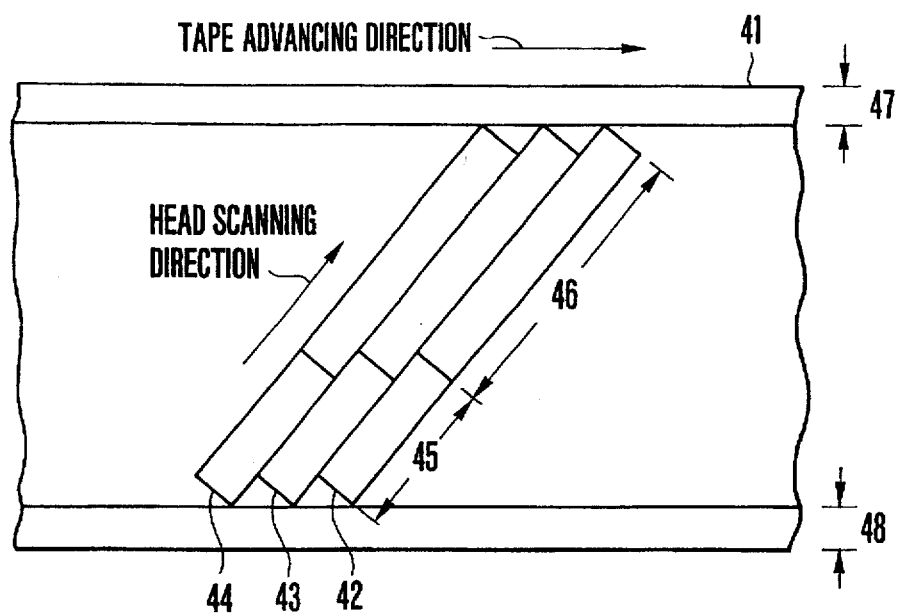
FIG. 1 is a diagram of the track patterns of the 8 mm VTR.
Figure 2:
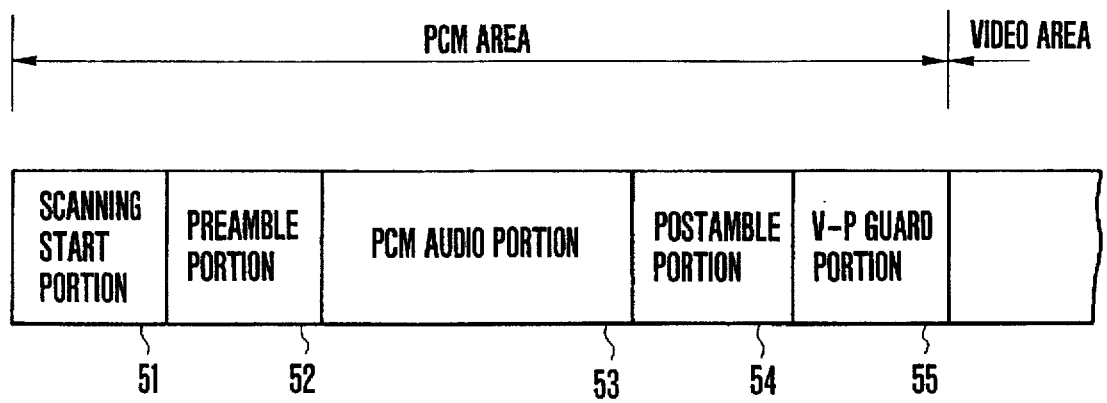
FIG. 2 is a diagram illustrating the recording format of the PCM area of the 8 mm VTR.
Figure 3:
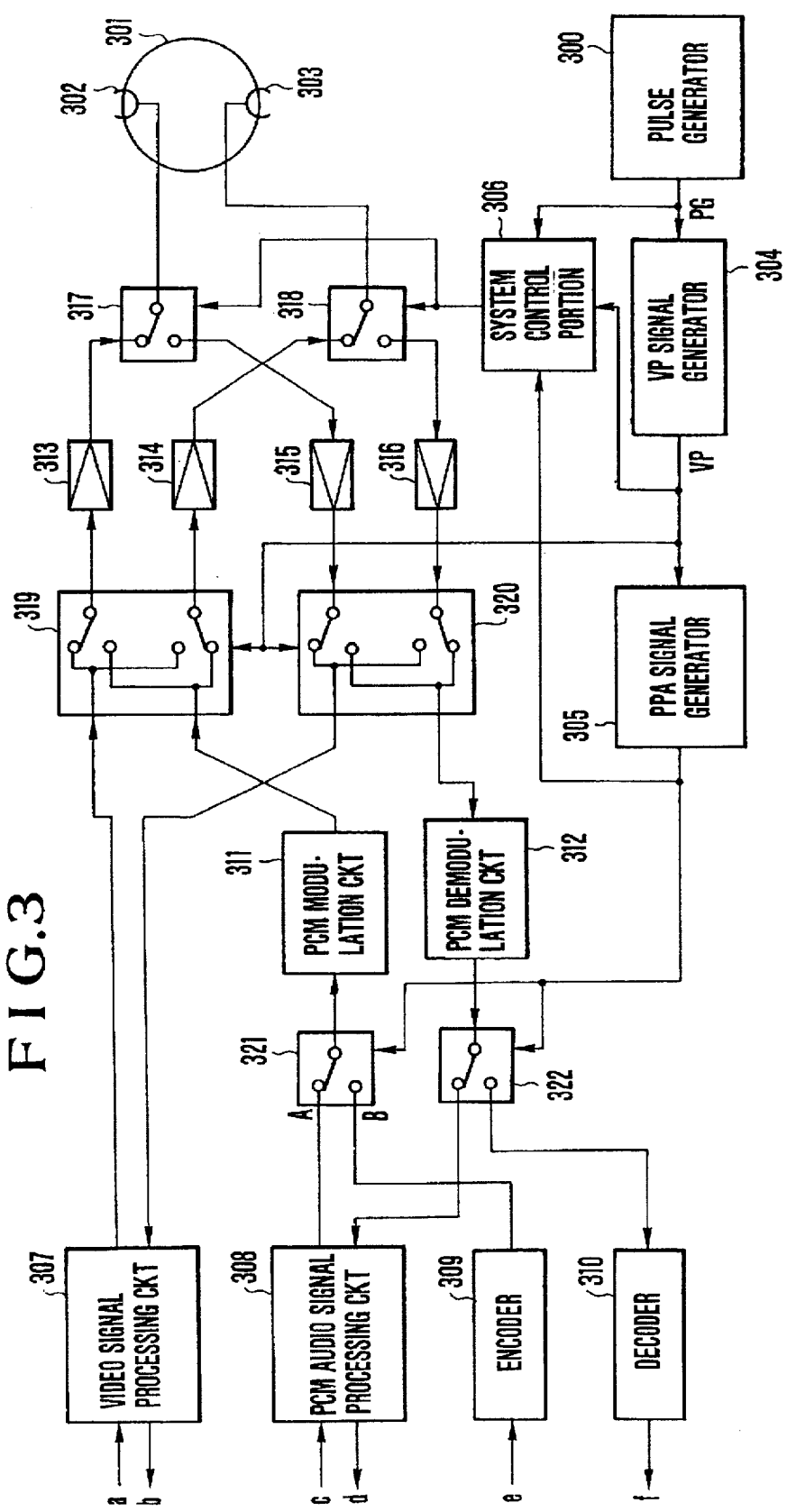
FIG. 3 is a diagram illustrating the construction of the VTR portion of an embodiment of a camera-integrated VTR according to the invention.
Figure 4:
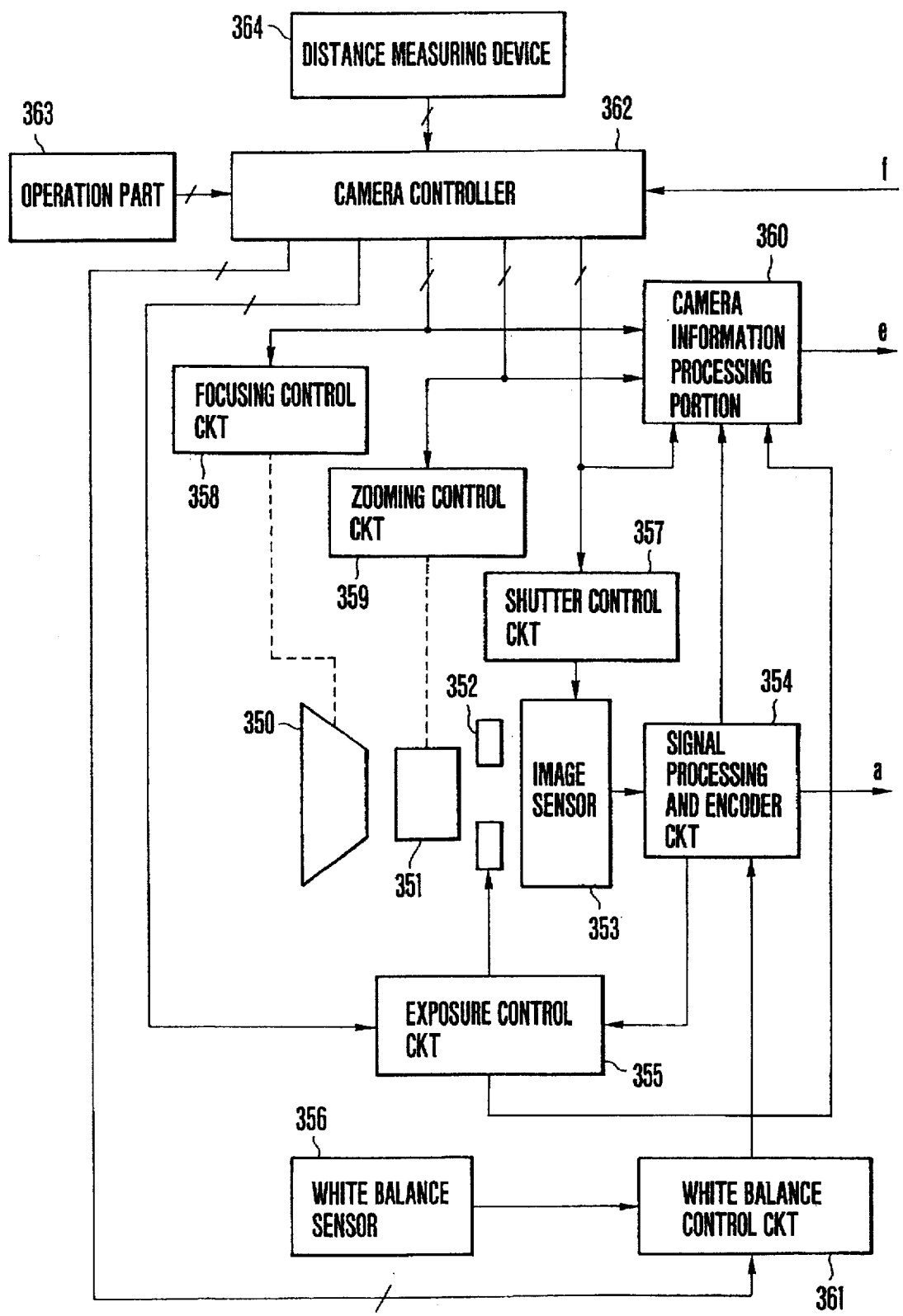
FIG. 4 is a diagram illustrating the construction of the camera portion of an embodiment of the camera-integrated VTR according to the invention.

FIG. 3 is a diagram roughly illustrating the construction of the VTR portion of the camera-integrated type VTR of the present embodiment, and FIG. 4 is a diagram illustrating the construction of the camera portion of the camera-integrated type VTR of the present embodiment.

Figure 5:
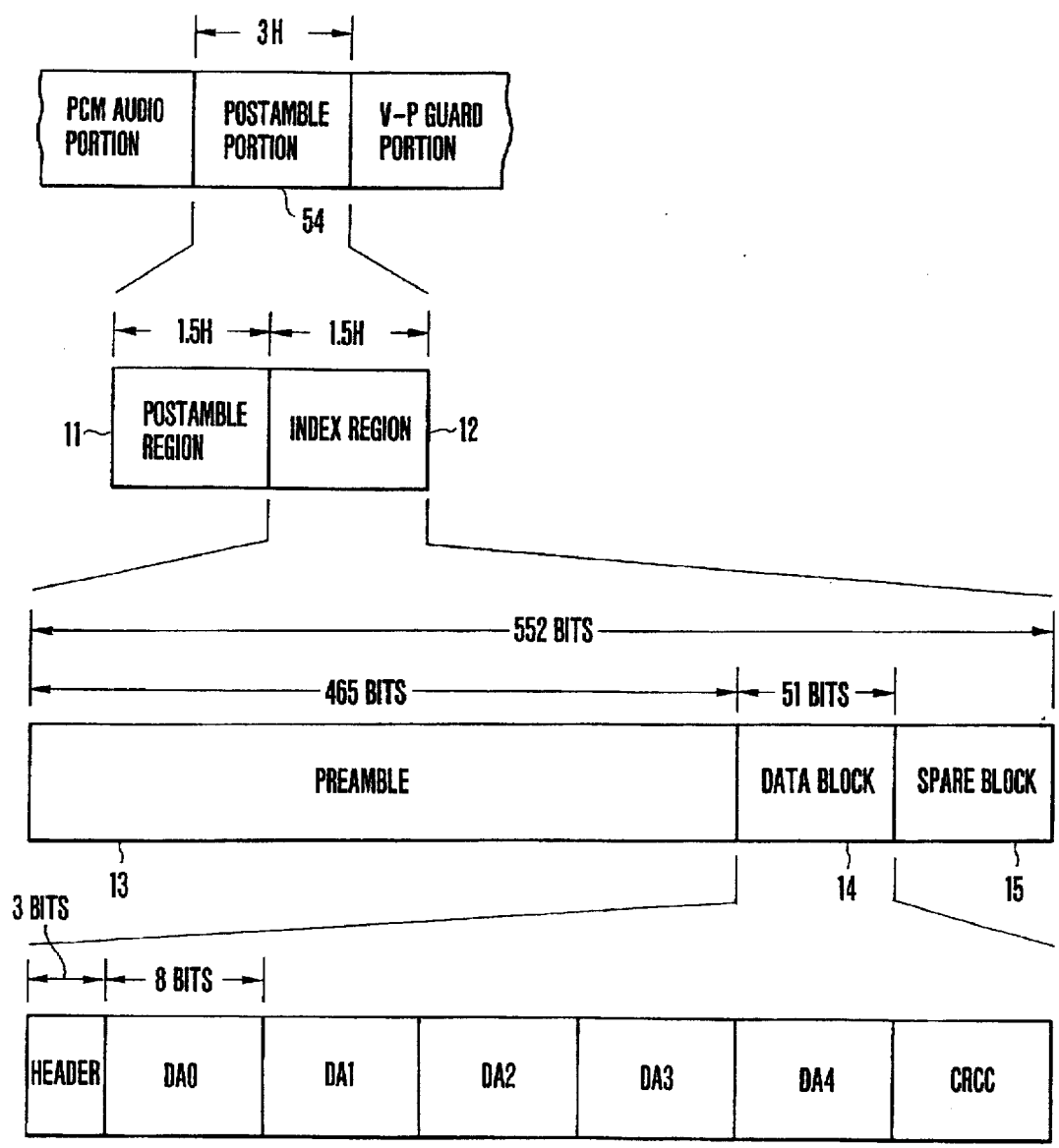
FIG. 5 is a diagram illustrating the recording format for the camera information according to the VTR of FIG. 3.

In the VTR of the present embodiment, the camera information representing an operating state of the camera portion is recorded on the tape. Its recording format is first described briefly. FIG. 5 is a diagram illustrating the recording format of the postamble of the PCM area according to the VTR of the present embodiment, and FIG. 6 is a diagram illustrating the data format which is recorded in the data block of FIG. 5.

At first, with regard to the place where the camera information is recorded, the postamble portion 54 which is utilized for the above-described "0" index of head search is used. In FIG. 5, the postamble portion 54 corresponds to a space of 3 H (1 H is equal to one horizontal scanning period of video signal). This portion is divided into a front half or postamble region 11 and a rear half or index region 12, whose periods each last for 1.5 H. The postamble region 11 is used for recording the postamble signal for the PCM audio data. The index region 12 is used for recording the camera information.

The index region 12 corresponds to data of 552 bits. The first 465 bits are made to be a preamble 13 of recording the preamble signal for the data block 14 (corresponding to 51 bits) that is a subsequent region in which the camera information is recorded, and the remaining region is a spare block 15. Further, the data block 14 is constructed from a block header of 3 bits, words DA0, DA1, DA2, DA3 and DA4 each comprised of 8 bits, and a CRC code for detecting errors in these words. The coded camera information is recorded in these words DA0–DA4.

The camera information to be recorded in the words DA0–DA4 is allocated, as shown in FIG. 6, so that concerning the exposure, whether it is automatic or manual and how much F value, etc. are set at that time are recorded on the word DA0; concerning the white balance, whether it is automatic or manual and the color temperature detected at that time on the word DA1; concerning focusing, whether it is automatic or manual and the position of the focusing lens at that time on the word DA2; concerning zooming, the positions of the zooming lenses on the word DA3; and concerning the electronic shutter, how fast shutter speed is set on the word DA4.

Next, the operations of the various portions of the present embodiment are described by reference to FIG. 3 and FIG. 4. In FIG. 3, a pulse generator 300 generates a pulse PG of 30 Hz which becomes a reference for servo of the phase of rotation of a drum 301 having rotary heads 302 and 303 thereon. Using the pulse PG, a VP signal generator 304 produces a pulse VP indicating the timing of changeover between the PCM area and the video area. Using the pulse VP, a PPA signal generator 305 produces a pulse PPA indicating the timing of changeover between the PCM audio portion and the postamble portion. A system control portion 306 controls the timing of operations of the various portions of the VTR by using the pulses PG, VP and PPA.

A video signal processing circuit 307 is a portion that performs processing for the purposes of recording and reproducing the video signals. The video signal to be used for recording is input from a terminal "a", and the reproduced video signal is output to a terminal "b". A PCM audio signal processing circuit 308 is a portion that performs processing for the purposes of recording and reproducing the PCM audio signals. The audio signal to be used for recording is input from a terminal "c", and the reproduced audio signal is output to a terminal "d". An encoder 309 codes the camera information input from a terminal "e" in each field of video signal to be recorded based on the format shown in FIG. 5 and FIG. 6. (The data obtained by coding the camera information is hereinafter called the "camera" data.) A decoder 310 decodes the camera data and outputs the camera information from a terminal "f".

A PCM modulation circuit 311 PCM-modulates the PCM audio data and camera data to record them on the tape. A PCM demodulation circuit 312 PCM-demodulates the signal read from the tape by the rotary heads 302 and 303. Recording amplifiers 313 and 314 are amplifiers for recording the signal on the tape by the rotary heads 302 and 303. Reproducing amplifiers 315 and 316 are amplifiers for reproducing the signal read from the tape by the rotary heads 302 and 303. Switches 317 and 318 are controlled by a signal output from the system control portion 306. Switches 319 and 320 are controlled by the pulse VP. Switches 321 and 322 are controlled by the pulse PPA.

The operation in the recording mode of the VTR of such construction described above is first described. The video signal input from the terminal "a" is changed to the signal form suited to be recorded in the video signal processing circuit 307, and is supplied to the switch 319.

Meanwhile, the audio signal input from the terminal "c" after having been converted into digital form in the PCM audio signal processing circuit 308 is subjected to predetermined processing and supplied as the audio data to a terminal A of the switch 321. The camera information input from the terminal "e" is coded by the encoder 309 and is likewise supplied as the camera data to a terminal B of the switch 321. The switch 321 is connected by the pulse PPA to the terminal A when the rotary head 302 or 303 scans the PCM audio portion of the PCM area of the recording track of the tape, and to the terminal B when it scans the postamble portion. By this, the PCM audio data and the camera data are supplied to the PCM modulation circuit 311 and, after being PCM-modulated, supplied to the switch 319. The switch 319 connects, according to the pulse VP, the PCM modulation circuit 311 with the recording amplifier 313 or 314 when the rotary head 302 or 303 scans the PCM area, or the video signal processing circuit 307 with the recording amplifier 313 or 314 when it scans the video area. The switches 317 and 318, as are controlled from the system control portion 306, connect the recording amplifiers 313 and 314 to the rotary heads 302 and 303 respectively. By this, the PCM audio data, the camera data and the video signal supplied successively through the switch 319 are supplied through the recording amplifiers 313 and 314 to the rotary head 302 and the rotary head 303 and, by having these heads 302 and 303 alternately scan on the tape, are recorded in the predetermined areas.

Next, the operation in the reproduction mode is described. In the reproduction mode, the switches 317 and 318 connect, according to the instructions of the system control portion 306, the rotary heads 302 and 303 to the reproducing amplifiers 315 and 316 respectively. The signals read by the rotary head 302 and the rotary head 303 are output through the reproducing amplifier 315 and the reproducing amplifier 316 respectively to the switch 320. The switch 320 is changed over by the pulse VP and the switch 322 by the pulse PPA depending on the areas the rotary head 302 and the rotary head 303 scan, so that the video signal is supplied to the video signal processing circuit 307, and the PCM audio data and the camera data are supplied through the PCM demodulation circuit 312 to the PCM audio signal processing circuit 308 and to the decoder 310, respectively.

The video signal is processed by the video signal processing circuit 307 and is output from the terminal "b". The PCM audio data is processed by the PCM audio signal processing circuit 308 and is output as the PCM audio signal from the terminal "d". The camera data is decoded by the decoder 310 and is output as the camera information from the terminal "f".

By such an operation as described above, the recording and reproducing of the camera information are realized. Next, the operation of the normal shooting mode of the camera portion that provides the camera information is described by reference to FIG. 4.

In FIG. 4, a focusing lens 350 is driven for focusing purposes. A zooming lens 351 is driven to change the focal length. An iris 352 is for adjusting the amount of light entering through the focusing lens 350 and the zooming lens 351. An image sensor 353 converts the received light into an electrical signal. A signal processing and encoder circuit 354 processes this electrical signal to produce as a video signal from a terminal "a". An exposure control circuit 355 controls the iris 352 in accordance with the luminance signal level of the video signal output from the signal processing and encoder circuit 354.

A white balance sensor 356 detects the color temperature and supplies its information to a white balance control circuit 361. The circuit 361 supplies white balance control data for compensating the color temperature to the signal processing and encoder circuit 354 according to the color temperature information.

A shutter control circuit 357 is controlled by a camera controller 362 according to the operation of an operation part 363 and outputs a control pulse to the image sensor 353 to determine the shutter speed of an electronic shutter.

A focusing control circuit 358 is controlled by the camera controller 362 according to the distance information supplied from a distance measuring device 364 and determines the position of the focusing lens 350. Further, a zooming control circuit 359 is controlled by the camera controller 362 according to the operation of the operating part 363 and controls the position of the zooming lens 351. A camera information processing portion 360 encodes the camera information and outputs the coded information from a terminal "e" to the VTR portion.

In the camera portion constructed in such a way as described above, the received light through the focusing lens 350, the zooming lens 351 and the iris 352 is converted into the electrical signal by the image sensor 353 and is output as the video signal from the terminal "a" of the signal processing and encoder circuit 354. At this time, what are shown in FIG. 6, or the information on the exposure from the exposure control circuit 355, the information on the white balance from the signal processing and encoder circuit 354, and the information on the focusing, the information on the zooming and the information on the electronic shutter each from the camera controller 362, are supplied to the camera information processing portion 360. This processing portion 360 supplies these items of information as the camera information through the terminal "e" to the VTR portion.

Next, the joined shooting and the insert recording using the already recorded camera information are described. At first, in the state where the tape is positioned at a joined shooting start point or at an insertion start point, the system control portion 306 of the VTR portion actuates a tape transport system (not shown) and rewinds the tape for a predetermined period. And, after that, when a start of recording is commanded, it renders the VTR portion in a reproducing state, and the tape is transported at the same speed as in the recording mode. This state is exactly the same as in the reproducing mode previously described. So, the recorded camera information is obtained from the decoder 310. This camera information is supplied to the camera controller 362.

At this time, the camera controller 362, regardless of the operation of the operating part 363 according to the recorded camera information, renders operative the focusing control circuit 358, the zooming control circuit 359, the shutter control circuit 357, the exposure control circuit 355 and the white balance control circuit 361. That is, the shooting operation that occurred when taking the video signal being reproduced reappears by the camera portion. And, when the aforesaid joined shooting start point or insert start point is reached, the VTR portion comes into the recording mode and starts to record the video signal coming from the camera portion.

At this recording start time, the operating state of the camera portion is exactly the same as when recording the scene obtained just before. In this joint portion, the operating state of the camera never changes. After this recording start, the operating state of the camera portion varies according to the operation of the operation part 363, the output of the distance measuring device 364 and, further, the output of the white balance sensor 365, etc. By the way, in general, the varying speeds of these are set so as not to become above the predetermined speeds. Therefore, the continuity of the images at the joint portion becomes very high.

According to the camera-integrated type VTR of the embodiment as described above, the shooting state of the camera does not change in the joint portion of the joined shooting, insert recording, etc. Therefore, the continuity of the image in this portion does not deteriorate.

It should be noted that though in the above-described embodiment, the description has been made taking an example of the VTR of the camera-integrated type, the invention is applicable even to the so-called separate type of system where the camera and the VTR are housed in the different casings and connected to each other by a cable or the like. Also, as the camera information, it is not limited to the information mentioned in the above-described embodiment, provided it concerns with the operating state when shooting of the camera.

Further, as to that part of the postamble portion of the PCM area in which the camera information is not recorded, it is also possible to utilize it for "0" index for head search, etc.

As has been described above, according to the video signal recording apparatus of the invention, the information concerned with the operating state of the camera is recorded. Therefore, an advantage of improving the continuity of image in the joint portion of the image can be obtained.

What is claimed is:

1. A video signal recording apparatus, comprising:

(a) video signal recording means for forming recording tracks on a recording medium to record a video signal formed by a video camera;

(b) control information recording and reproducing means for recording control information which indicates conditions of forming the video signal by said video camera on the recording medium and for reproducing the control information from said recording medium; and (c) control means for controlling said video camera in accordance with the control information reproduced by said control information recording and reproducing means, said recording means recording the video signal formed by said video camera controlled by said control means in accordance with the control information reproduced by said control information recording and reproducing means;

the recording of the video signal being effected by the video signal recording means following reproduction of the control information.

2. An apparatus according to claim 1, further comprising:

video reproducing means for reproducing said video signal from said recording tracks formed on said recording medium.

3. An apparatus according to claim 2, wherein said control recording and reproducing means records said control information while said video recording means is recording said video signal.

4. An apparatus according to claim 1, wherein said control information includes exposure information concerned with an exposure control state of said video camera.

5. An apparatus according to claim 1, wherein
said control information includes white balance information concerned with a white balance control state of said video camera.

6. An apparatus according to claim 1, wherein
said control information includes focusing information concerned with a focus adjusting state of said video camera.

7. An apparatus according to claim 1, wherein
said control information includes shutter information indicative of a shutter speed of said video camera.

8. An apparatus according to claim 1, wherein
said control information includes zooming information indicative of the zoom magnification of said video camera.

9. An apparatus according to claim 11, wherein each of said recording tracks has a video area in which said video signal is recorded and a control area in which said control information is recorded.

10. An apparatus according to claim 9, wherein each of said recording tracks further has an audio area in which an audio signal is recorded, and wherein said control area is arranged between said video area and said audio area.

11. An apparatus according to claim 6, wherein said focusing information includes focus mode information indicative of whether focus adjustment of said video camera is an automatic control mode or a manual control mode.

12. An apparatus according to claim 6, wherein said focusing information includes lens position information indicative of a position of a lens for focus adjustment in said video camera.

13. An apparatus according to claim 1, wherein said control information is a digital signal.

14. A video signal recording apparatus, comprising:
   (a) a video camera for converting an image of an object into a video signal by using an optical device;
   (b) video signal recording means for forming recording tracks in parallel on a recording medium to record the video signal from the video camera;
   (c) control information recording and reproducing means for recording control information which indicates conditions of the optical device in converting the image into the video signal on said recording medium and for reproducing control information from said recording medium; and
   (d) control means for controlling said video camera in accordance with the control information reproduced by said control information recording and reproducing means,
   said control means controlling the optical device of said video camera in accordance with the control information reproduced by said control information recording and reproducing means;
   the recording of the video signal being effected by the video signal recording means following reproduction of the control information.

15. A system according to claim 14, further comprising:
video reproducing means for reproducing said video signal from said recording tracks formed on said recording medium.

16. A system according to claim 15, wherein
said control means controls said video camera regardless of said control information when said video recording means is recording said video signal; and
said control means controls said video camera in accordance with said control information when said video reproducing means is reproducing said video signal.

17. A system according to claim 15, wherein said control recording and reproducing means records said control information when said video recording means is recording said video signal and reproduces said control information when said video reproducing means is reproducing said video signal.

18. An apparatus according to claim 14, wherein said control information is a digital signal.

19. An apparatus according to claim 14, wherein said control information includes exposure information concerned with an exposure control state of said video camera.

20. An apparatus according to claim 14, wherein
said control information includes white balance information concerned with a white balance control state of said video camera.

21. An apparatus according to claim 14, wherein
said control information includes focusing information concerned with a focus adjusting state of said video camera.

22. An apparatus according to claim 14, wherein
said control information includes shutter information indicative of a shutter speed of said video camera.

23. An apparatus according to claim 14, wherein said control information includes zooming information indicative of the zoom magnification of said video camera.

24. A video signal recording apparatus, comprising:
   (a) video signal recording means for recording a video signal formed by a video camera into a storage device;
   (b) control signal recording and reproducing means for recording control signal which indicates conditions of forming the video signal by the video camera into the storage device and reproducing the control signal from the storage device; and
   (c) output means for supplying the control signal reproduced by said control signal recording and reproducing means to the video camera;
   the video camera being controlled according to the control signal supplied by said output means,
   said video signal recording means recording the video signal formed by the video camera controlled according to the control signal supplied by said output means;
   the recording of the video signal being effected by the video signal recording means following reproduction of the control signal.

25. An apparatus according to claim 24, wherein said video camera includes optical member, and said control signal indicates conditions of the optical member.

26. An apparatus according to claim 24, wherein said video signal recording means records the video signal on a first portion of the storage device, and said control signal recording and reproducing means records the control signal on a second portion of the storage device.

27. An apparatus according to claim 24, wherein said control signal is a digital signal.

28. An apparatus according to claim 27, wherein said second portion of the storage device has plural areas on which plural kinds of digital signals indicating naturally different informations, and said control signal recording means records the control signal as a digital signal of plural bits on a predetermined area of the second portion.

29. An apparatus according to claim 27, wherein said control information includes exposure information concerned with an exposure control state of said video camera.

30. An apparatus according to claim 27, wherein
said control information includes white balance information concerned with a white balance control state of said video camera.

31. An apparatus according to claim 27, wherein
said control information includes focusing information concerned with a focus adjusting state of said video camera.

32. An apparatus according to claim 28, wherein
said control information includes shutter information indicative of a shutter speed of said video camera.

33. An apparatus according to claim 27, wherein said control information includes zooming information indicative of the zoom magnification of said video camera.

34. A video signal recording apparatus, comprising:
(a) a video camera for converting an image of an object into a video signal by using an optical device;
(b) video signal recording means for recording the video signal formed by the video camera into a storage device;
(c) control signal recording and reproducing means for recording control signal which indicates conditions of the optical device in said converting operation of the video camera into the storage device and for reproducing the control signal from the storage device,
wherein the optical device of the video camera is capable of being controlled according to the control signal reproduced by said control signal recording and reproducing means;
the recording of the video signal being effected by the video signal recording means following reproduction of the control signal.

35. An apparatus according to claim 34, wherein said video signal recording means records the video signal on a first portion of the storage device and said control signal recording and reproducing means records the control signal on a second portion of the storage device.

36. An apparatus according to claim 34, wherein said control signal is a digital signal.

37. An apparatus according to claim 36, wherein said second portion of the storage device has plural areas on which plural kinds of digital signals indicating naturally different informations, and said control signal recording means records the control signal as a digital signal of plural bits on a predetermined area of the second portion.

38. An apparatus according to claim 36, wherein said control information includes exposure information concerned with an exposure control state of said video camera.

39. An apparatus according to claim 36, wherein
said control information includes white balance information concerned with a white balance control state of said video camera.

40. An apparatus according to claim 36, wherein
said control information includes focusing information concerned with a focus adjusting state of said video camera.

41. An apparatus according to claim 36, wherein
said control information includes shutter information indicative of a shutter speed of said video camera.

42. An apparatus according to claim 36, wherein said control information includes zooming information indicative of the zoom magnification of said video camera.

* * * * *

UNITED STATES PATENT AND TRADEMARK OFFICE
CERTIFICATE OF CORRECTION

PATENT NO. : 5,684,919

DATED : November 4, 1997

INVENTOR(S) : Kikuzawa et al.

It is certified that error appears in the above-identified patent and that said Letters Patent is hereby corrected as shown below:

Col. 1, line 51, delete "data)," and insert -- data) --.

Col. 6, line 12, delete "By the way, in" and insert -- In --.

Col. 7, line 22, delete "claim 11" and insert -- claim 1 --.

Signed and Sealed this

Ninth Day of June, 1998

Attest:

BRUCE LEHMAN

Attesting Officer  Commissioner of Patents and Trademarks